(12) United States Patent
Stevens

(10) Patent No.: US 7,749,111 B1
(45) Date of Patent: Jul. 6, 2010

(54) SYSTEM AND METHOD FOR BONDING AN ACRYLIC SURFACE TO A FRAME

(75) Inventor: Larry Stevens, Fruit Heights, UT (US)

(73) Assignee: Lifetime Products, Inc., Clearfield, UT (US)

( * ) Notice: Subject to any disclaimer, the term of this patent is extended or adjusted under 35 U.S.C. 154(b) by 1388 days.

(21) Appl. No.: 09/228,325

(22) Filed: Jan. 11, 1999

(51) Int. Cl.
*A63B 63/08* (2006.01)
(52) U.S. Cl. ....................... 473/479; 473/481
(58) Field of Classification Search ................. 473/479, 473/481, 482, 480
See application file for complete search history.

(56) References Cited

U.S. PATENT DOCUMENTS

| | | | | |
|---|---|---|---|---|
| 4,951,179 A | * | 8/1990 | Machida | 362/522 |
| 5,677,896 A | * | 10/1997 | Nunes | 368/10 |
| 5,839,982 A | * | 11/1998 | Hying et al. | 473/481 |
| 5,980,401 A | * | 11/1999 | Erlewine | 473/481 |
| 6,004,231 A | * | 12/1999 | Schickert et al. | 473/481 |

OTHER PUBLICATIONS

3-M Data Sheet—www.3m.com/market/industrial/additives/perfen_1.html—p. 1-9, Dec. 1998.*
3-M Data Sheet—www.3m.com/market/industrial/additives/appguide.html—pg. 1-2—zeeos_1.html—p. 1-13, Mar. 28, 2001.*
GE Data Sheet—www.gesilicons.com/usadatasheets/1717.html—p. 1-5, Mar. 23, 2001.*
Speriglass datasheet www.pottersbeads.com—8 pages—2003.*
Web Page downloaded on Jun. 24, 2005, Ichemco, www.ichemco.it/ENG/tab/siliconepsa.asp, 1 page.*
"Preliminary Product Data Sheet D-1-SEA 210 Silicone Elastomeric Adhesive," Product Information Brochure, General Electric, 3 pages, 1994.
"SS4004, SS4044, and SS4179 Silicone Primers for use with One-Component RTV Silicone Adhesive Sealants," Product Information Brochure, General Electric, 2 pages, 1992.
"D1-SEA213B 2-Component Condensation Cure RTV," Product Information Brochure, General Electric, 7 pages, Apr. 21, 1998.
"SSS4179 Silicone Primer," Product Information Brochure, General Electric, 8 pages, Apr. 21, 1998.
"Information About Specialty Materials for High Technology Applications," Product Information Brochure, Dow Corning, 2 pages, 1987.

* cited by examiner

*Primary Examiner*—Gene Kim
*Assistant Examiner*—M Chambers
(74) *Attorney, Agent, or Firm*—Workman Nydegger

(57) ABSTRACT

A basketball backboard assembly and a method of making the backboard assembly are disclosed. The assembly includes a backboard frame structure and an acrylic backboard which are bonded together with a suitable elastomeric adhesive, such as a silicone adhesive, providing adequate adhesion and flexibility. The elastomeric adhesive has a bond gap in the range from about 2 to 2.5 mm. The adhesive is catalyzed to provide control of the set time in the range from about 5 minutes to 1 hour. A plurality of bond gap spacers are located between the frame bonding surface and the backboard bonding surface to provide the bond gap.

26 Claims, 1 Drawing Sheet

SYSTEM AND METHOD FOR BONDING AN ACRYLIC SURFACE TO A FRAME

FIELD OF THE INVENTION

The present invention relates to a system and method for bonding an acrylic surface to a frame. More particularly, the present invention is directed to a system and method for adhesively bonding an acrylic basketball backboard to a frame structure.

BACKGROUND

As the game of basketball has increased in popularity, a greater number of people have purchased basketball systems for use at their homes. Such basketball systems typically, comprise at least a pole to which a backboard and a goal is secured so that the goal is suspended above a playing surface. The basketball backboard can be made of a variety of materials including various polymers and composites. Clear acrylic backboards are becoming increasingly popular because they resemble professional backboards.

There are several problems which must be overcome to successfully use an acrylic basketball backboard. First, the backboard must be adequately bonded to a support frame. Second, there must be sufficient flexibility in the bond to dissipate the impact energy from the backboard to the frame. If the bond between the backboard and frame is too rigid, then the backboard can fracture. If the bond is too loose, then the adhesion fails.

One successful resolution of this problem has been the use of two-sided tape having a foam center. One suitable tape, known as "VHB" tape, is commercially available from 3M and Norton. The tape is typically applied to the frame structure, and then the acrylic backboard is pressed on the taped frame.

A significant problem with the use of the two-sided tape described above is the time and labor required to apply the tape to the frame. Currently, substantial manual labor is used to prepare the acrylic backboard surface and frame surface to receive the adhesive tape, to manually lay the tape, and to press the taped backboard and frame together. It would be a substantial improvement in the art to automate the labor-intensive steps in assembly of an acrylic basketball backboard.

Such an automated system and method for bonding an acrylic surface to a frame is disclosed and claimed herein.

SUMMARY OF THE INVENTION

The present invention relates to an acrylic basketball backboard assembly and to a method of bonding an acrylic basketball backboard to a frame structure. The assembly includes a basketball backboard frame structure and an acrylic backboard which are bonded together with a suitable elastomeric adhesive. Silicone adhesive is currently preferred because of its excellent adhesion and flexibility and low cost. The elastomeric adhesive replaces conventional VHB double-sided tape. Applying adhesive to either the backboard or frame structure can be automated and performed by commercially available robotic equipment, thereby improving the efficiency and cost of the basketball backboard assembly process.

A significant problem with most elastomeric adhesives is the long cure time. This problem was solved according to the present invention by using a catalyzed adhesive. The amount of cure catalyst used can vary to provide an optimum set time. Currently, the adhesive is configured to provide a set time in the range from about 5 minutes to 1 hour, and more preferably from about 7 to 15 minutes.

Another problem with elastomeric adhesives was the need to provide controlled and reproducible adhesion and flexibility of the adhesive bond. It was observed that the bond gap directly affected adhesion and flexibility. For example, if the bond gap was too great, good flexibility was observed at the expense of adhesion, with cohesive failure occurring. If the bond gap was too little, good adhesion was obtained at the expense of flexibility. Thus, there was a need to control the bond gap. The currently preferred adhesive bond gap is in the range from about 2 to 2.5 mm.

The bond gap is preferably controlled according to the present invention by including a plurality of bond gap spacers within the adhesive bond. The bond gap spacers are positioned between the frame bonding surface and the backboard bonding surface to provide the bond gap. A variety of different bond gap spacers can be used according to the present invention. Spherical beads, such as glass microspheres, are currently preferred.

DESCRIPTION OF THE INVENTION

Figure 1:
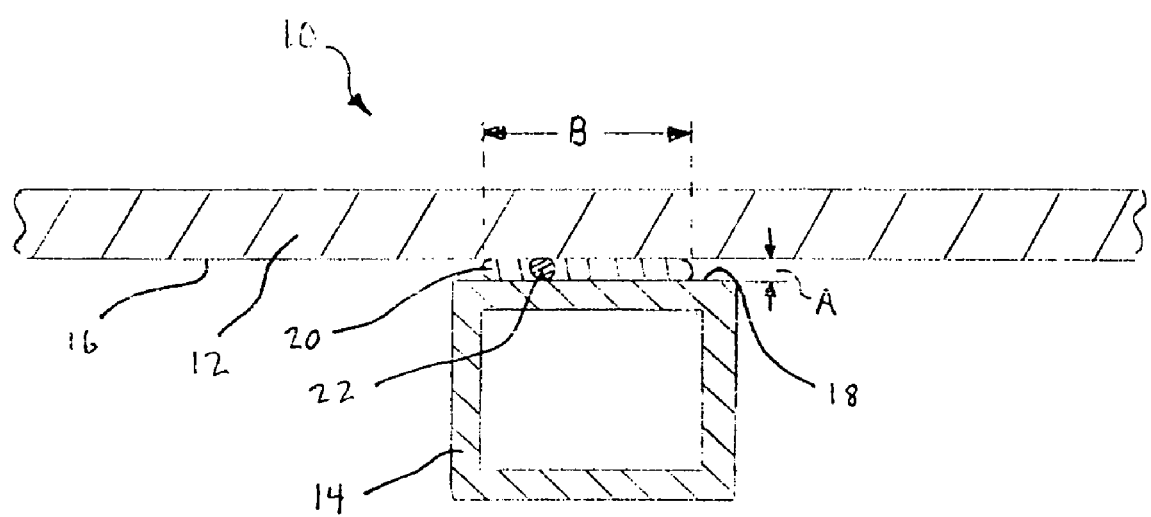
FIG. 1 is a cross-sectional view of an acrylic backboard bonded to a frame structure.

The present invention is directed to an acrylic basketball backboard assembly and to a method of bonding an acrylic basketball backboard to a frame structure. FIG. 1 shows cross-sectional view of a cut-away portion of an acrylic basketball backboard assembly 10. The backboard assembly 10 includes an acrylic backboard 12 bonded to a frame structure 14. The backboard 12 includes a backboard bonding surface 16, and the frame structure 14 includes a frame bonding surface 18. An elastomeric adhesive 20 is sandwiched between the two bonding surfaces 16 and 18. The elastomeric adhesive 20 replaces the VHB double-sided tape currently used with acrylic backboards.

After testing a large number of different elastomeric adhesives from different suppliers, silicone adhesive was preferred because it provides a bond of sufficient strength and flexibility, comparable to that obtained with conventional foam filled, two-sided tape. It was also preferred because of its low cost and availability. Other adhesives, such as urethane, polyurethane, hot melt adhesives, methylmethacrylate, and cyanoacrylate adhesives did not perform as well as silicone in providing the desired balance between bond strength and flexibility and/or were more expensive. Although other elastomeric adhesives can be made suitable for use in the present invention, silicone adhesive is currently preferred and will be discussed below.

Suitable silicone adhesive has been obtained from General Electric (D1-SEA 210) and from Dow Corning (Q3-6093). The commercially available silicone adhesive includes dimethylpolysiloxane as a primary ingredient, with N-propylsilicate, aminopropyltriethoxysilane, methoxysilylpropylisocyanurate) as minor ingredients.

In a currently preferred embodiment, the silicone adhesive has a bond gap (labelled "A" in FIG. 1) in the range from about 2 to 2.5 mm (0.08 to 0.1 inch). If the bond gap is too small, there is not sufficient flexibility in the bond to dissipate the impact energy from the backboard created when the basketball strikes the backboard. The bond between the backboard and frame is too rigid, and the backboard tends to fracture. If the bond gap is too great, there is good flexibility, but the bond is not strong enough. Adhesion failure occurs within the silicone adhesive itself and not at the bond interface with the backboard or frame.

To provide the currently preferred adhesive bond gap, bond gap spacers 22 are located between the frame bonding surface and the backboard bonding surface. Suitable spacers can be any rigid structure having the desired thickness which can maintain the gap between the frame and backboard bonding surfaces. Currently preferred bond gap spacers include spherical beads, and more preferably glass microspheres. Glass microspheres having a diameter in the range from about 2 to 2.5 mm (0.08 to 0.1 inch) function very well. Other bond gap spacers which have been used successfully include weed trimmer line and plastic beads.

One problem with conventional single stage silicone adhesive is its long cure time, typically about 24 hours or more. If the cure time is too great, then an undue amount of manufacturing space is required to store the backboard assemblies while they cure. This problem was solved according to the present invention by using a catalyzed silicone adhesive. Typical commercially available catalyzed silicone adhesives contain two parts: (1) the adhesive itself and (2) a separate catalyst which is mixed with the adhesive to initiate curing. The ratio of catalyst to adhesive is preferably combined to provide a set time in the range from 5 minutes to 1 hour, and more preferably a set time in the range from about 7 to 15 minutes. The set time is defined as the time at which the adhesive sets sufficiently to enable the backboard assembly to be moved and handled.

The present invention also includes a method of bonding an acrylic basketball backboard to a frame structure. The method can be automated and performed by a suitable robotic device, thereby substantially reducing the assembly time and manual labor previously required to prepare acrylic backboard assemblies.

In the method according to the present invention, the backboard and frame bonding surfaces are preferably prepared to receive the elastomeric adhesive. For the frame structure, this is typically performed by roughening the surface. For instance, the surface can be roughened by rubbing a scouring pad, of the type commonly found in kitchens, over the surface. The backboard frame structure is typically painted metal. The paint is preferably a powder coated paint composition.

For the acrylic surface, it must be chemically treated to break the surface tension of the acrylic surface. Although the treatment will vary depending on the adhesive used, it typically will include a chemical mixture of acetone and the adhesive itself. The appropriate acrylic surface preparation is usually provided by the supplier of the elastomeric adhesive.

It has been found that when the acrylic backboard bonding surface contains a printed image, the printing itself provides an adequate surface preparation for the elastomeric adhesive such that a separate backboard surface preparation step is not necessary.

In the method of bonding an acrylic basketball backboard to a frame structure, the elastomeric adhesive can be applied to either the acrylic backboard or frame structure bonding surface. For example, if the adhesive is applied to the bonding surface of the acrylic backboard, then the frame structure is placed against the backboard such that the bonding surface of the frame structure contacts the adhesive. Alternatively, if the adhesive is applied to the bonding surface of the frame structure, then the acrylic backboard is placed against the frame structure such that the bonding surface of the backboard contacts the adhesive.

In either case, a predetermined bond gap is maintained between the backboard bonding surface and the frame bonding surface. As discussed above, the bond gap is important to achieving a suitable balance between adhesion and flexibility. The method can include the step of positioning a plurality of bond gap spacers between the frame bonding surface and the backboard bonding surface to provide the desired adhesive bond gap. The bond gap spacers preferably provide a bond gap in the range from about 2 to 2.5 mm (0.08 to 0.1 inch). Suitable bond gap spacers comprise spherical beads, such as glass microspheres, or other structures which are compatible with the adhesive. Glass microspheres are currently preferred because they are easily dispensed using an automated dispensing device. Furthermore, when silicone adhesive is used, the glass microspheres bond to the adhesive.

The elastomeric adhesive is allowed to cure. A catalyzed adhesive can be used to tailor the set time for elastomeric adhesives.

As discussed above, The method includes the step of preparing the frame structure bonding surface and the acrylic backboard bonding surface to receive the elastomeric adhesive. For the frame structure, this is usually a roughening of the surface. For the acrylic backboard, this is usually a chemical treatment specifically formulated for the adhesive being used. However, the step of preparing the acrylic backboard bonding surface to receive the adhesive can include printing an image on the bonding surface with an ink which securely bonds to the bonding surface.

Although the bond width (labelled "B" in FIG. 1) is not critical to the present invention, it is presently preferred to apply the elastomeric adhesive with a bond width in the range from about 1 cm to 2 cm.

To evaluate various elastomeric adhesives, a standard test was developed to measure adhesion and flexibility. A baseline was obtained based upon the currently used double-sided VHB tape available from 3M and Norton. A digital level was used to measure flexibility, and a torque wrench was used to test adhesion.

Test specimens consisted of a 3-inch by 6-inch piece of acrylic and a 6-inch long powder coated 1-inch by 1-inch tubing to simulate a backboard frame. The acrylic and tubing were prepped to receive the double-sided VHB tape. Ten specimens were prepared using 3M brand VHB tape, and ten specimens were prepared using Norton brand VHB tape. The test pieces were centered and bonded with the tape and ran through a compaction roller, to simulate conventional acrylic backboard assembly. The test pieces were allowed to sit 24 hours. The electronic level and torque wrench were then used to obtain a degree of deflection and a torque force at failure. The type of failure was also noted: either cohesive failure (tape fails with adhesion to both substrate), acrylic failure (acrylic does not adhere), and powder coat failure (powder coat does not adhere). All VHB tapes pieces showed cohesive failure.

All twenty tests were averaged to establish a baseline for elastomeric adhesives to meet or exceed. The baseline was a 20° deflection at 125 inch-pounds torque.

Various elastomeric adhesives were tested from the following manufacturers: Ashland, Ciba-Giga, Dapp, Devcon, Dow Corning, Elsworth, General Electric, Goop, Hysol, H.B. Fuller, and Resin Tech Group. It was found that the catalyzed silicone adhesive having the desired bond gap obtained from 25° to 45° deflection at 160 inch-pounds torque.

It will be appreciated that the present invention provides an acrylic basketball backboard which utilizes an elastomeric adhesive, such as silicone adhesive, to replace the conventional double-sided tape. The elastomeric adhesive provides good adhesion and flexibility. Advantageously, the labor-intensive steps in assembly of an acrylic basketball backboard can be automated using the present invention. Furthermore, the elastomeric adhesive cost can also be less than the cost of the double-sided tape.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. A basketball backboard assembly that is sized and configured for playing the game of basketball, the basketball backboard assembly comprising:
    a basketball backboard frame structure having a bonding surface;
    an acrylic basketball backboard having a bonding surface; and
    a catalyzed elastomeric adhesive sandwiched between the frame bonding surface and the backboard bonding surface, wherein the elastomeric adhesive provides sufficient adhesion and flexibility to the acrylic backboard and frame structure bonding surface to be used in the game of basketball.

2. A basketball backboard assembly as in claim 1, further comprising one or more bond gap spacers located between the frame bonding surface and the backboard bonding surface to provide a defined bond gap.

3. A basketball backboard assembly as in claim 2, wherein the one or more bond gap spacers comprise spherical beads.

4. A basketball backboard assembly as in claim 2, wherein the one or more bond gap spacers comprise glass microspheres.

5. A basketball backboard assembly as in claim 2, wherein the one or more bond gap spacers comprise glass microspheres that have a diameter in the range from about 2 to 2.5 mm (0.08 to 0.1 inch).

6. A basketball backboard assembly as in claim 1, wherein the elastomeric adhesive has a bond gap in the range from about 2 to 2.5 mm (0.08 to 0.1 inch).

7. A basketball backboard assembly as in claim 1, wherein the elastomeric adhesive is a two-part catalyzed adhesive in which the two parts are combined in a ratio to provide a set time in the range from about 7 to 15 minutes.

8. A basketball backboard assembly as in claim 1, wherein the backboard frame structure is constructed from metal.

9. A basketball backboard assembly as in claim 1, wherein the backboard frame structure is painted metal.

10. A basketball backboard assembly as in claim 1, wherein the backboard bonding surface contains a printed image.

11. A basketball backboard assembly as in claim 1, wherein the elastomeric adhesive is a two-part catalyzed adhesive in which the two parts are combined in a ratio to provide a set time in the range from about 5 minutes to 1 hour.

12. A basketball backboard assembly that is sized and configured for playing the game of basketball, the basketball backboard assembly comprising:
    a metal basketball backboard frame structure having a bonding surface;
    an acrylic basketball backboard having a bonding surface;
    a catalyzed silicone adhesive sandwiched between the frame bonding surface and the backboard bonding surface, wherein the silicone adhesive is configured to provide a set time in the range from about 5 minutes to 1 hour, wherein the silicone adhesive provides sufficient adhesion and flexibility to the acrylic backboard and frame structure bonding surfaces to be used in the game of basketball; and
    one or more bond gap spacers located between the frame bonding surface and the backboard bonding surface to provide the bond gap.

13. A basketball backboard assembly as in claim 12, wherein the silicone adhesive is configured to provide a set time in the range from about 7 to 15 minutes.

14. A basketball backboard assembly as in claim 12, wherein the one or more bond gap spacers comprise spherical beads.

15. A basketball backboard assembly as in claim 12, wherein the one or more bond gap spacers comprise glass microspheres.

16. A basketball backboard assembly as in claim 12, wherein the one or more bond gap spacers comprise glass microspheres that have a diameter in the range from about 2 to 2.5 mm (0.08 to 0.1 inch).

17. A basketball backboard assembly comprising:
    a basketball backboard frame;
    a basketball backboard constructed from acrylic; and
    a catalyzed silicone-based adhesive connecting the basketball backboard and the basketball backboard frame and positioned between at least a portion of the basketball backboard and at least a portion of the basketball backboard frame.

18. A basketball backboard assembly as in claim 17, wherein the basketball backboard frame is constructed from metal.

19. A basketball backboard assembly comprising:
    a basketball backboard frame;
    a basketball backboard; and
    a catalyzed elastomeric adhesive connecting the basketball backboard and the basketball backboard frame and positioned between at least a portion of the basketball backboard and at least a portion of the basketball backboard frame.

20. A basketball backboard assembly as in claim 19, wherein the basketball backboard is constructed from acrylic.

21. A basketball backboard assembly comprising:
    a basketball backboard frame;
    a basketball backboard; and
    a catalyzed elastomeric adhesive connecting the basketball backboard and the basketball backboard frame and positioned between at least a portion of the basketball backboard and at least a portion of the basketball backboard frame.

22. A basketball backboard assembly as in claim 21, wherein the basketball backboard is constructed from acrylic.

23. A basketball backboard assembly comprising:
    a basketball backboard frame;
    a basketball backboard; and
    a silicone-based adhesive connecting the basketball backboard and the basketball backboard frame and positioned between at least a portion of the basketball backboard and at least a portion of the basketball backboard frame.

24. A basketball backboard assembly as in claim 23, wherein the basketball backboard is constructed from acrylic.

25. A basketball backboard assembly comprising:
    a basketball backboard frame;
    a basketball backboard;

a silicone-based adhesive connecting the basketball backboard and the basketball backboard frame and positioned between at least a portion of the basketball backboard and at least a portion of the basketball backboard frame; and one or more bond gap spacers positioned between at least a portion of the basketball backboard and at least a portion of the basketball backboard frame to provide a defined bond gap.

26. A basketball backboard assembly as in claim 25, wherein the basketball backboard is constructed from acrylic.

* * * * *

UNITED STATES PATENT AND TRADEMARK OFFICE
CERTIFICATE OF CORRECTION

| | | |
|---|---|---|
| PATENT NO. | : 7,749,111 B1 | |
| APPLICATION NO. | : 09/228325 | |
| DATED | : July 6, 2010 | |
| INVENTOR(S) | : Larry Stevens | |

It is certified that error appears in the above-identified patent and that said Letters Patent is hereby corrected as shown below:

<u>Column 1</u>
Line 16, change "typically," to --typically--

<u>Column 2</u>
Line 36, after "shows" insert --a--

<u>Column 4</u>
Line 23, change "The" to --the--
Line 55, change "substrate" to --substrates--

Signed and Sealed this
Fourth Day of January, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,749,111 B1 | Page 1 of 1 |
| APPLICATION NO. | : 09/228325 | |
| DATED | : July 6, 2010 | |
| INVENTOR(S) | : Stevens | |

It is certified that error appears in the above-identified patent and that said Letters Patent is hereby corrected as shown below:

In Column 2, Lines 63-64, delete "methoxysilylpropylisocyanurate)" and insert -- 1, 3, 5-tris(trimethoxysilylpropylisocyanurate) --, therefor.

Signed and Sealed this
Eleventh Day of September, 2012

David J. Kappos
*Director of the United States Patent and Trademark Office*

(12) EX PARTE REEXAMINATION CERTIFICATE (10172nd)
United States Patent
Stevens

(10) Number: US 7,749,111 C1
(45) Certificate Issued: May 21, 2014

(54) SYSTEM AND METHOD FOR BONDING AN ACRYLIC SURFACE TO A FRAME

(75) Inventor: Larry Stevens, Fruit Heights, UT (US)

(73) Assignee: Lifetime Products, Inc., Clearfield, UT (US)

Reexamination Request:
No. 90/012,654, Sep. 14, 2012

Reexamination Certificate for:
Patent No.: 7,749,111
Issued: Jul. 6, 2010
Appl. No.: 09/228,325
Filed: Jan. 11, 1999

Certificate of Correction issued Jan. 4, 2011

Certificate of Correction issued Sep. 11, 2012

(51) Int. Cl.
*A63B 63/08* (2006.01)

(52) U.S. Cl.
USPC .......................................... 473/479; 473/481

(58) Field of Classification Search
None
See application file for complete search history.

(56) References Cited

To view the complete listing of prior art documents cited during the proceeding for Reexamination Control Number 90/012,654, please refer to the USPTO's public Patent Application Information Retrieval (PAIR) system under the Display References tab.

*Primary Examiner* — Patricia Engle

(57) ABSTRACT

A basketball backboard assembly and a method of making the backboard assembly are disclosed. The assembly includes a backboard frame structure and an acrylic backboard which are bonded together with a suitable elastomeric adhesive, such as a silicone adhesive, providing adequate adhesion and flexibility. The elastomeric adhesive has a bond gap in the range from about 2 to 2.5 mm. The adhesive is catalyzed to provide control of the set time in the range from about 5 minutes to 1 hour. A plurality of bond gap spacers are located between the frame bonding surface and the backboard bonding surface to provide the bond gap.

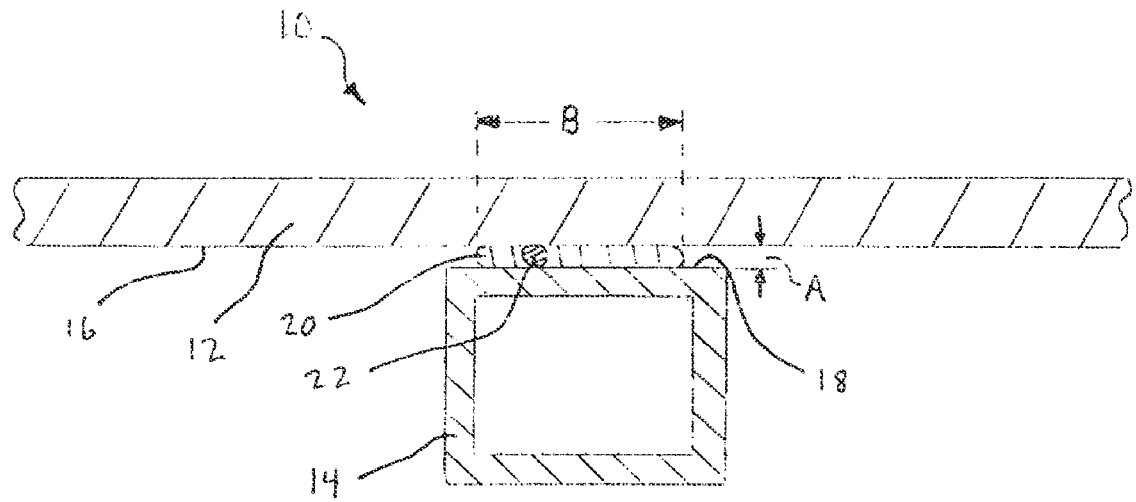

ic material.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-20 and 23-26 is confirmed.

Claim 21 is determined to be patentable as amended.

Claim 22, dependent on an amended claim, is determined to be patentable.

New claims 27-56 are added and determined to be patentable.

21. A basketball backboard assembly comprising:
a basketball backboard frame;
a basketball backboard; and
a catalyzed elastomeric adhesive connecting the basketball backboard and the basketball backboard frame and [positioned] *sandwiched* between *and directly contacting* at least a portion of the basketball backboard and at least a portion of the basketball backboard frame, *the catalyzed elastomeric adhesive comprising a non-tape adhesive*.

27. *A basketball backboard assembly that is sized and configured for playing the game of basketball, the basketball backboard assembly comprising:*
*a basketball backboard frame including a frame bonding surface;*
*a basketball backboard including a backboard bonding surface; and*
*a catalyzed elastomeric adhesive sandwiched between and directly connecting the frame bonding surface and the backboard bonding surface, the catalyzed elastomeric adhesive comprising a non-tape adhesive.*

28. *The basketball backboard assembly as in claim 27, wherein the catalyzed elastomeric adhesive provides sufficient adhesion and flexibility between the frame bonding surface and the backboard bonding surface to allow the basketball backboard assembly to be used in the game of basketball.*

29. *The basketball backboard assembly as in claim 27, wherein the catalyzed elastomeric adhesive is a two-part catalyzed adhesive.*

30. *The basketball backboard assembly as in claim 27, wherein the catalyzed elastomeric adhesive is a silicone based adhesive.*

31. *The basketball backboard assembly as in claim 27, wherein the basketball backboard frame is constructed from metal.*

32. *The basketball backboard assembly as in claim 27, wherein the frame bonding surface comprises a painted metal surface.*

33. *The basketball backboard assembly as in claim 27, wherein the backboard bonding surface comprises a printed image.*

34. *The basketball backboard assembly as in claim 27, wherein the basketball backboard is constructed from an acrylic material.*

35. *The basketball backboard assembly as in claim 27, wherein the basketball backboard is constructed from a polymer material.*

36. *The basketball backboard assembly as in claim 27, wherein the basketball backboard is constructed from a composite material.*

37. *The basketball backboard assembly as in claim 27, further comprising one or more bond gap spacers disposed between the frame bonding surface and the backboard bonding surface.*

38. *The basketball backboard assembly as in claim 27, wherein the basketball backboard frame is constructed from metal;*
*wherein the basketball backboard is constructed from acrylic; and*
*wherein the backboard bonding surface comprises a printed image.*

39. *The basketball backboard assembly as in claim 27, wherein the basketball backboard frame is constructed from metal;*
*wherein the basketball backboard is constructed from a polymer material; and*
*wherein the backboard bonding surface comprises a printed image.*

40. *The basketball backboard assembly as in claim 27, wherein the basketball backboard frame is constructed from metal;*
*wherein the basketball backboard is constructed from a composite material; and*
*wherein the backboard bonding surface comprises a printed image.*

41. *A basketball backboard assembly that is sized and configured for playing the game of basketball, the basketball backboard assembly comprising:*
*a basketball backboard frame including a frame bonding surface;*
*a basketball backboard including a backboard bonding surface; and*
*a silicone-based adhesive sandwiched between and directly connecting the frame bonding surface and the backboard bonding surface, the silicone-based adhesive comprising a non-tape adhesive disposed between the frame bonding surface and the backboard bonding surface.*

42. *The basketball backboard assembly as in claim 41, wherein the adhesive provides sufficient adhesion and flexibility between the frame bonding surface and the backboard bonding surface to allow the basketball backboard assembly to be used in the game of basketball.*

43. *The basketball backboard assembly as in claim 41, wherein the adhesive is a catalyzed adhesive.*

44. *The basketball backboard assembly as in claim 41, wherein the adhesive is a two-part catalyzed adhesive.*

45. *The basketball backboard assembly as in claim 41, wherein the adhesive is an elastomeric adhesive.*

46. *The basketball backboard assembly as in claim 41, wherein the adhesive is a catalyzed, elastomeric adhesive.*

47. *The basketball backboard assembly as in claim 41, wherein the basketball backboard frame is constructed from metal.*

48. *The basketball backboard assembly as in claim 41, wherein the frame bonding surface comprises a painted metal surface.*

49. *The basketball backboard assembly as in claim 41, wherein the backboard bonding surface comprises a printed image.*

50. The basketball backboard assembly as in claim 41, wherein the basketball backboard is constructed from an acrylic material.

51. The basketball backboard assembly as in claim 41, wherein the basketball backboard is constructed from a polymer material.

52. The basketball backboard assembly as in claim 41, wherein the basketball backboard is constructed from a composite material.

53. The basketball backboard assembly as in claim 41, further comprising one or more bond gap spacers disposed between the frame bonding surface and the backboard bonding surface.

54. The basketball backboard assembly as in claim 41, wherein the basketball backboard frame is constructed from metal;
    wherein the basketball backboard is constructed from acrylic; and
    wherein the backboard bonding surface comprises a printed image.

55. The basketball backboard assembly as in claim 41, wherein the basketball backboard frame is constructed from metal;
    wherein the basketball backboard is constructed from a polymer material; and
    wherein the backboard bonding surface comprises a printed image.

56. The basketball backboard assembly as in claim 41, wherein the basketball backboard frame is constructed from metal;
    wherein the basketball backboard is constructed from a composite material; and
    wherein the backboard bonding surface comprises a printed image.

\* \* \* \* \*